UNITED STATES PATENT OFFICE 2,590,125

10-(QUATERNARY-AMMONIUM ALKYL) PHENOTHIAZINE SALTS

Richard A. Robinson, Morton Grove, and John W. Cusic, Skokie, Ill., assignors to G. D. Searle & Co., Skokie, Ill., a corporation of Illinois No Drawing. Application June 6, 1947, Serial No. 753,050

10 Claims. (Cl. 260—243)

This invention relates to phenothiazines substituted in the 10-position by hydrocarbon radicals bearing a quaternary ammonium group, and to the preparation thereof. In particular it relates to compounds having the general formula:

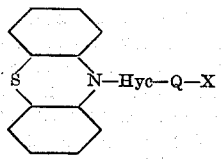

wherein Hyc is a bivalent non-aromatic hydrocarbon radical, Q is an aliphatic-type quaternary ammonium radical, and X is an anion.

The compounds which comprise this invention are useful as surface-active substances. They are also of value as therapeutic agents, having the properties of histamine antagonism and also being antispasmodic drugs. The compounds are furthermore antiseptics and germicides.

In the series of compounds of the above general formula, Hyc may represent an alkylene radical such as ethylene, propylene, trimethylene, tetramethylene, 1,2- and 2,3-butylene, amylene and related alkylene radicals. The hydrocarbon chain may be branched or straight. It may carry aromatic, aliphatic or aromatic heterocyclic, or alicyclic substituents such as phenyl, naphthyl, thienyl, cyclohexyl, cyclopentyl and the like. It may be a part of a carbocyclic or heterocyclic system, as for example a cyclohexylene radical or a cyclopentylene radical. It may also be part of an alicyclic system which includes the quaternary ammonium nitrogen, as for example part of a piperidine, pyrrolidine or morpholine ring.

The quaternary ammonium group, Q, is derived from a tertiary aliphatic or aliphatic-type amine. One of the bonds from the bivalent hydrocarbon grouping, Hyc, represents the fourth organic residue attached to the amino nitrogen atom, which is thereby converted to an ammonium ion of valence 1. Q can stand for a trialkyl-amino radical, wherein the alkyl radicals can be the same or different. It can represent an N-alkyl heterocyclic aliphatic-type amino radical such as N-alkylmorpholino, N-alkylpiperidino, N-alkylpyrrolidino, N-alkylthiamorpholino, and C-alkylated derivatives of such radicals. Q can represent quaternary ammonium groups wherein one or more of the radicals joined to the nitrogen atom are chosen from alphyl radicals as illustrated by the following: aralkyl radicals, such as phenethyl and benzyl; substituted aralkyl radicals, such as anisyl, p-chlorobenzyl, p-methylbenzyl, veratryl and the like; and aromatic-type heterocyclic-alkyl, such as thenyl and furfuryl. The aliphatic radicals attached to the quaternary nitrogen atom can be alkyl, such as methyl, ethyl, n-propyl, isopropyl, n-butyl, isobutyl, sec-butyl, amyl, iso-amyl; alkenyl, as crotyl, allyl, propargyl and other unsaturated aliphatic radicals; haloalkyl groups, such as beta-chloroethyl, beta-bromoethyl, the chloro- and bromopropyls and higher haloalkyls such as bromobutyl and chloroamyl.

The tertiary amine which makes up the grouping Q is chosen from the strong organic bases. This class includes aliphatic amines, alphyl amines, and heterocyclic aliphatic-type amines. All such amines have ionization constants in the range of $10^{-3}$ to $10^{-6}$.

The anion X is chosen from inorganic ions such as chloride, iodide, bromide, phosphate and sulfate. It further includes organic anions such as those obtained from complex acidic materials such as 8-chlorotheophylline, 8-bromotheophylline, and related haloxanthines. Other organic anions which are encompassed by X include those of organic acids such as acetic, propionic, tartaric, citric, arylsulfonic, oxalic, malic, benzoic and maleic, as well as esters of dibasic acids such as sulfuric, phosphoric and related inorganic acids, and the like.

Among the compounds which are within the purview of this invention are the following:

(A) 1-(10 phenothiazinyl)-2-propyl-trimethylammonium chloride, which has the formula

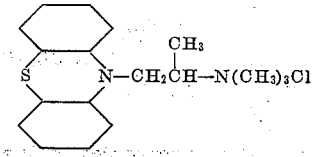

(B) 1-(10-phenothiazinyl)-2-butyl-trimethylammonium chloride, of the formula

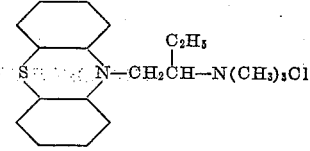

(C) N-beta-(10 - phenothiazinyl) ethyl - N - methylmorpholinium chloride, having the formula

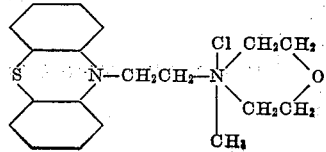

(D) Beta - (10 - phenothiazinyl) propyl-methyl-ethyl-butyl-ammonium p-toluenesulfonate, of the formula

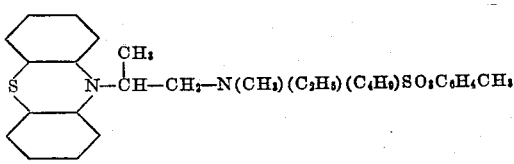

(E) Beta - (10 - phenothiazinyl) butyl - dimethyl-ethyl-ammonium methyl sulfate, which has the formula

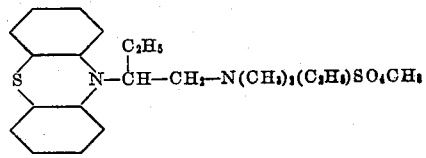

(F) N - gamma - (10 - phenothiazinyl) butyl - N-ethyl-pyrrolidinium iodide, having the formula

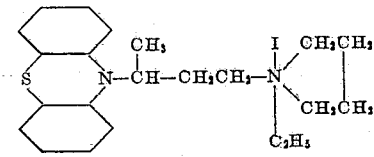

(G) Delta - (10 - phenothiazinyl) butyl - dimethyl-benzyl-ammonium chloride, of the formula

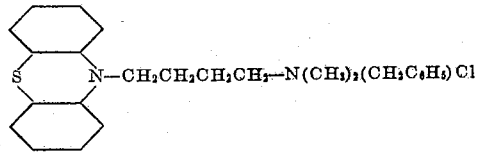

(H) (Alpha-ethyl-gamma-10 phenothiazinyl) - butyl-dimethyl-allyl-ammonium bromide, having the formula

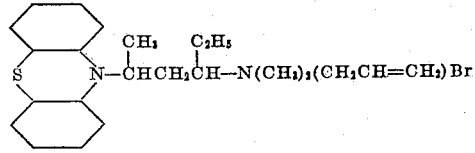

(I) 4 - (10 - phenothiazinyl) cyclohexyl - trimethyl-ammonium chloride, of the formula

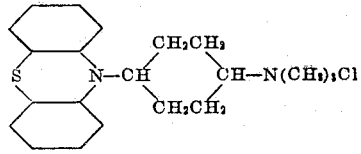

(J) Gamma - (10 - phenothiazinyl) propyl - diethyl-alpha-thenyl-ammonium chloride, which has the formula

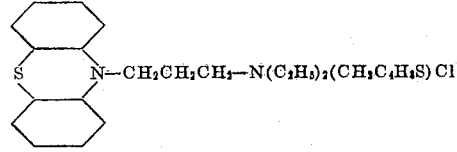

(K) Beta-(10-phenothiazinyl) propyl - methylethyl - beta - chloroethyl - ammonium chloride, which has the formula

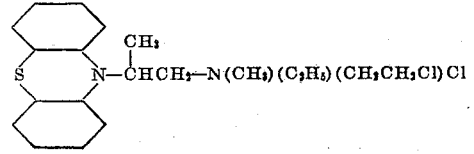

(L) N,N-dimethyl-2-(beta-10-phenothiazinyl-ethyl)-piperadinium bromide, having the formula

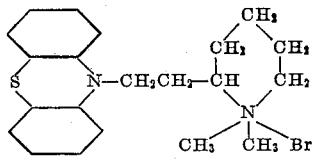

(M) (Beta - 10 - phenothiazinyl - alpha,alpha-dimethyl)-ethyl-trimethyl-ammonium chloride, of the formula

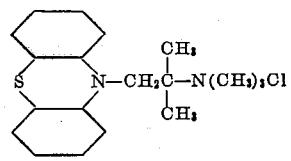

The compounds to which this invention relates may be prepared by a variety of synthetic methods. A tertiary-aminoalkyl halide can be condensed with phenothiazine in the presence of alkali or other alkaline condensing agents to form a 10-(tertiary-aminoalkyl) phenothiazine which can subsequently be condensed with an alkyl halide, an alkyl sulfate or an alkyl phosphate or with an aralkyl halide or alkenyl halide to form the desired quaternary ammonium compounds. A second method of synthesis comprises reacting a 10-(haloalkyl) phenothiazine with a tertiary amine such as a trialkylamine or a dialkylaralkylamine or an N-alkyl aliphatic-type heterocyclic amine and the desired quaternary compound may be isolated directly. Another synthetic method involves the reaction of a 10-(haloalkyl)-phenothiazine with a secondary amine such as a dialkylamine or a diaralkylamine or a cyclic aliphatic-type amine. The resulting 10-(aminoalkyl) phenothiazine thus prepared can be converted into a quaternary ammonium compound by treatment with an alkylating or aralkylating agent. One anion may be substituted for another anion of these quaternary ammonium compounds. For example, an iodide may be converted to a chloride by treatment with silver chloride in water or alcohol or other simple organic solvent. Likewise, a halide may be substituted by a more complex organic anion such as a benzoate, an acetate or an 8-halotheophyllineate, by reaction with a heavy metal salt of the organic acid, as for example a silver salt of 8-chlorotheophylline.

As used in this application, the term alkylene means a bivalent radical derived from a saturated aliphatic hydrocarbon and may be straight or branched. Alphyl radical represents an aliphatic radical or an aliphatic-like radical wherein the carbon bearing the valence bond of the radical is aliphatic in character, as exemplified by aromatic-substituted alkyl radicals such as benzyl and thenyl radicals and alkoxy-, hydroxy- and halo-substituted alkyl radicals. Alphyl amines are amines wherein the radicals substituted on nitrogen are alphyl radicals.

A quaternary ammonium group, as represented in this application by Q, has one of the general formulas

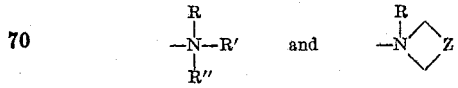

wherein R, R' and R'' are monovalent non-aromatic organic radicals and Z is a bivalent non-aromatic organic radical. The nitrogen atom of Q is bound to four organic residues and therefore exists as a positive monovalent ion.

By the use of mono- and dioxides of 10-(tertiary-aminoalkyl)phenothiazines there may be prepared by processes similar to those disclosed herein the corresponding 10-(quaternary-ammonium alkyl)phenothiazine oxide and dioxide salts.

Our invention is further illustrated by the preparation of a variety of compounds as shown in the following examples. These examples are presented for the purpose of illustration and are not intended to limit our invention in spirit or in scope.

Example 1

155 grams of 10-(beta-dimethylaminoethyl)-phenothiazine, 50 g. of methyl chloride in 800 cubic centimeters of methyl ethyl ketone, and 300 cc. of isopropyl alcohol are mixed and stored at room temperature for 18 hours. The solution is then heated to 90–100° centigrade for 30 minutes. The crystals of beta-(10-phenothiazinyl)-ethyl-trimethyl-ammonium chloride which separate are filtered and recrystallized from a mixture of isopropyl alcohol and methyl ethyl ketone, and melt at 230° C.

This compound can be prepared by an alternative procedure as follows: 10 g. of 10-(beta-chloroethyl)phenothiazine, 5 cc. of anhydrous trimethylamine and 75 cc. of ethyl methyl ketone are heated in a closed system at 50–60° C. for 20 hours and then at 100° C. for two hours. The crystals of beta - (10 - phenothiazinyl)ethyl - trimethyl-ammonium chloride are recrystallized as above and are shown to be identical with the compound prepared by the above procedure as shown by mixed melting point.

Example 2

A mixture of 26 g. of 10-(beta-dimethylaminoethyl)phenothiazine, 12 g. of ethyl bromide and 100 cc. of ethyl methyl ketone is kept at 50–60° C. for 18 hours and then heated to 100° C. for 2 hours. The crystals of beta-(10-phenothiazinyl)-ethyl-dimethyl-ethyl-ammonium bromide which precipitate are removed by filtration, washed with ethyl methyl ketone and recrystallized from a mixture of isopropyl alcohol and ether. They melt at about 140° C.

Example 3

110 g. of phenothiazine, 60 g. of powered sodium hydroxide, and 500 cc. of toluene are heated to 95–100° C. while 95 g. of beta-dimethylamino-beta-methylpropyl chloride hydrochloride is added in portions over a period of 1½–2 hours. After the addition, the mixture is heated for 3 hours at 100±5° C. Some unchanged phenothiazine which crystallizes out when the mass cools is separated by filtration. The toluene filtrate is then extracted by dilute hydrochloric acid. The hydrochloride of 10-(beta-dimethylaminoisobutyl)phenothiazine, which is difficulty soluble in water, separates and is removed by filtration. It can be purified by recrystallization from isopropanol-ether. The hydrochloride is again converted to the free base in the usual way. The free base is purified by distillation; its boiling range at 1 millimeter pressure is 175–180° C.

17 g. of the above base and 10 g. of methyl chloride in methyl ethyl ketone are heated for 4 hours at 95–100° C. in a pressure bottle. The quaternary salt, Compound M, (beta-10-phenothiazinyl - alpha,alpha - dimethyl)ethyl - trimethyl-ammonium chloride, which separates is removed by recrystallization from isopropyl alcohol and methyl ethyl ketone. It melts at about 196° C.

Example 4

A mixture of 60 g. of 10-(beta-diethylaminoethyl)phenothiazine and 16 g. of methyl chloride in 200 cc. of ethyl methyl ketone is heated to 100° C. for 2 hours. The crystals of beta-(10-phenothiazinyl) ethyl-diethyl-methyl-ammonium chloride which are formed are separated and recrystallized from isopropyl alcohol; M. P. about 175° C.

By a similar procedure by using ethyl bromide instead of methyl chloride there is obtained beta-(10-phenothiazinyl)ethyl - triethyl - ammonium bromide of M. P. 198° C.

Example 5

Beta - (10-phenothiazinyl)ethyl-trimethyl-ammonium iodide is stirred in 80% ethanol with an equivalent amount of the silver salt of 8-chlorotheophylline. The solvent is distilled under reduced pressure and the residue is dried in vacuo. Recrystallization of the residue from isopropyl alcohol gives stout crystals of the beta-(10-phenothiazinyl)ethyl-trimethyl - ammonium salt of chlorotheophylline, M. P. 184° C.

Example 6

A solution of 33 g. of 10-(gamma-dimethylaminopropyl)phenothiazine and 10 g. of methyl chloride in 150 cc. of methyl ethyl ketone is heated in a sealed vessel at 100° C. for 2 hours. The crystalline product which is formed is removed by filtration, washed with hot methyl ethyl ketone and dried. There is thus obtained gamma-(10 - phenothiazinyl)propyl - trimethyl-ammonium chloride of M. P. 205° C.

By a similar procedure, by using ethyl bromide instead of methyl chloride, there is obtained gamma-(10 - phenothiazinyl)propyl - dimethyl-ethyl-ammonium bromide of M. P. 188° C.

Example 7

A solution of 37 g. of 10-(gamma-diethylaminopropyl)phenothiazine and 11 g. of methyl chloride in 150 cc. of methyl ethyl ketone is heated in a closed system at 90±5° C. for 2 hours. The precipitate of gamma-(10-phenothiazinyl)propyl-diethyl-methyl-ammonium chloride is recrystallized from the mixture of isopropyl alcohol and ether and melts at 200° C.

In a similar manner, using ethyl bromide in place of methyl chloride, there is obtained gamma(10 - phenothiazinyl)propyl - triethyl-ammonium bromide which after recrystallization from a mixture of isopropyl alcohol and ether melts at 152° C.

Example 8

A solution of 50 g. of methyl iodide in dry ether is added to 47 g. of 10-(beta-dimethylaminoethyl)phenothiazine. The resulting solution is refluxed for 2 hours. The crystalline precipitate of beta-(10 - phenothiazinyl)ethyl-trimethyl-ammonium iodide is removed by filtration, washed with ether and dried; M. P. 249–250° C.

In a similar way, starting with 10-(beta-diethylaminoethyl)phenothiazine, there is obtained beta-(10-phenothiazinyl)ethyl - diethyl-methyl-ammonium iodide of M. P. 149–150° C.

Example 9

39 g. of beta-(10-phenothiazinyl)ethyl-trimethyl-ammonium iodide in water are treated with silver oxide (prepared from 17 g. of silver nitrate) at room temperature for 1½ hours. The aqueous solution is filtered and to it are added 19 g. of theophylline hydrate. The resulting solution is evaporated under reduced pressure and at 25° C. The residue thus obtained is crystallized by washing with methyl ethyl ketone and recrystallized from isopropanol and melts at 175° C. There is thus obtained the beta-(10-phenothiazinyl) ethyl-trimethyl-ammonium salt of theophylline which is soluble in water and slightly alkaline.

*Example 10*

20 g. of 10-(beta-dimethylaminobutyl) phenothiazine are heated under pressure at 90–95° C. for 3 hours with a solution of 8 g. of methyl chloride in 100 cc. of methyl ethyl ketone. The crystalline product, Compound B, which separates is removed by filtration, washed with hot methyl ethyl ketone, and melts at 217° C. with decomposition.

*Example 11*

A solution of 211 g. of 2,6-lupetidine, 125 g. of ethylene bromohydrin in 200 cc. of methyl ethyl ketone is warmed for 2 hours at 60–75° C. The lupetidine hydrobromide that separates is removed by filtration and the filtrate is evaporated. The residue of 2,6-lupetidine-ethanol is distilled at 105–108° C., 20 mm. pressure.

79 g. of 2,6-lupetidine-ethanol are treated in 500 cc. of benzene with 120 cc. of thionyl chloride. After the addition of the thionyl chloride, the mixture is refluxed for 2 hours and evaporated to remove excess thionyl chloride and benzene. The residue of beta-chloroethyl-2,6-lupetidine is mixed with 130 g. of phenothiazine, 1 liter of toluene and 40 g. of powdered sodium hydroxide. The charge is agitated and refluxed for 30 min. An additional 20 g. of powdered sodium hydroxide is added and the mixture is refluxed for 3 hours. From the organic layer is obtained 10-(beta-2,6-lupetidinoethyl) phenothiazine, distilling at 225° C. at 1 mm. pressure.

22 g. of the base obtained above are reacted with 10 g. of methyl iodide and 125 g. of methyl ethyl ketone in a closed system at 90–95° C. for 4 hours. The crystalline quaternary salt is removed by filtration and melts at 223° C. with decomposition.

32 g. of the methiodide above are stirred in 700 cc. of 50% ethanol with silver chloride (prepared from 30 g. of silver nitrate) at 60–80° C. for 1 hour. The mass is filtered and evaporated at 50 mm. pressure. When the volume is reduced to 50–80 cc., N-beta-(10-phenothiazinyl)-ethyl-N-methyl-2,6-lupetidinium chloride crystallizes. This is removed and dried in vacuo and melts at about 232° C. with decomposition.

*Example 12*

A solution containing 35 g. of 10-(beta-diethylaminopropyl) phenothiazine and 25 g. of methyl iodide in 200 cc. of methyl ethyl ketone is heated at about 100° C. in a closed system for 3 hours. The crystalline quaternary ammonium iodide which separates is removed by filtration and treated with excess silver chloride as in Example 11. By this procedure there is obtained 1-(10 - phenothiazinyl)-2 - propyl-diethyl-methyl-ammonium chloride which melts with decomposition at about 208° C.

*Example 13*

A solution of phenyllithium is prepared from 75 g. of bromobenzene, 7 g. of lithium and 500 cc. of anhydrous ether. To it is added 80 g. of phenothiazine made into a paste with ether. The orange-red solution of 10-phenothiazinyllithium thus prepared is transferred under nitrogen to a mixture of 200 g. of tetramethylene chloride and 500 cc. of dry ether during the course of 1 hour. The ether is removed by distillation and the residue is heated to 100–110° C. for 15 minutes. The reaction mass is filtered to remove salts and the 10-(delta-chlorobutyl) phenothiazine distils at 205–210° C. at 1 mm. pressure.

35 g. of 10-(delta-chlorobutyl) phenothiazine and 21 g. of dimethylamine in 250 cc. of methyl ethyl ketone are heated for 4 hours at 90–100° C. under pressure. The reaction mixture is filtered to remove dimethylamine hydrochloride and the filtrate is evaporated. The residue is taken up in 1500 cc. of ether and the ether solution is extracted with dilute hydrochloric acid. The acid extract is made alkaline and extracted with ether. The ether is dried and evaporated and the residue distils at 195° C. and 1 mm. pressure. 50 g. of 10-(delta-dimethylaminobutyl) phenothiazine thus obtained are reacted with 16 g. of methyl chloride in 175 cc. of methyl ethyl ketone. The crystalline quaternary salt is removed by filtration, washed with hot methyl ethyl ketone and dried in vacuo. The product, delta-(10-phenothiazinyl) butyl - trimethyl - ammonium chloride, melts at 185° C.

An alternative process for preparing the compound follows: 35 g. of 10-(delta-chlorobutyl)-phenothiazine and 9 g. of trimethylamine are heated under pressure in 200 cc. of methyl ethyl ketone at 90–100° C. for 4 hours. The crystalline quaternary salt is removed by filtration and washed with hot methyl ethyl ketone. The filtrate is reacted further with trimethylamine for 5 hours at 90–100° C and an additional quantity of quaternary salt is thus obtained. The combined salts are recrystallized from a mixture of isopropanol and ether.

*Example 14*

25 g. of 10-(beta-piperidinoethyl) phenothiazine are stored under pressure at room temperature for 48 hours with 10 g. of methyl chloride in 150 cc. of methyl ethyl ketone. At the end of this time the mixture is heated to 90–100° C. for 4 hours. The N-beta-(10-phenothiazinyl)-ethyl-N-methyl-piperidinium chloride which crystallizes out is filtered and washed with hot methyl ethyl ketone and melts with decomposition at about 213° C.

*Example 15*

20 g. of 10-(beta-diamethylaminopropyl)-phenothiazine is heated for 3 hours in a closed system at 90–95° C. with a solution of 10 g. of methyl chloride in 175 cc. of methyl ethyl ketone. The quaternary salt which crystallizes out is filtered and washed well with hot methyl ethyl ketone. 1 - (10-phenothiazinyl) - 2 - propyl-trimethyl-ammonium chloride thus prepared melts with decomposition at about 227° C.

We claim:

1. A 10 - (quaternary - ammonium - alkyl) - phenothiazine salt having the following structural formula

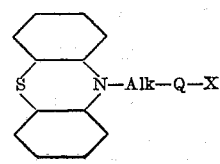

wherein Alk is a lower alkylene radical, X is one equivalent of an anion, and Q is a quaternary ammonium radical of the group consisting of NRR'R" and

in which R, R' and R" are lower alkyl radicals and Z is a lower alkylene radical which with N forms a saturated monocyclic heterocyclic radical in which the sole hetero element is nitrogen and which contains at least 5 and not more than 6 ring members.

2. A 10-(quaternary-ammonium-alkyl)phenothiazine having the following structural formula

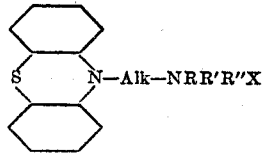

wherein Alk is a lower alkylene radical, R, R' and R" are lower alkyl radicals and X is one equivalent of an anion.

3. A 10 - (quaternary - ammonium-propyl) - phenothiazine having the following structural formula

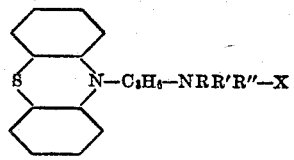

wherein R, R' and R" are lower alkyl radicals and X is one equivalent of an anion.

4. A 10-(halo-trimethyl-ammonium-propyl) - phenothiazine having the formula

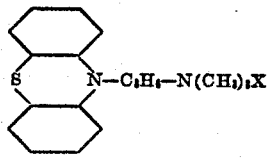

wherein X is a halogen.

5. Alpha-(10-phenothiazinyl)-beta-trimethyl-ammonium-propane chloride, having the following structural formula

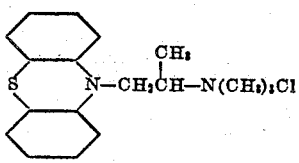

6. A 10 - (quaternary - ammonium - ethyl) - phenothiazine having the following structural formula

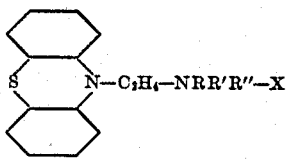

wherein R, R' and R" are lower alkyl radicals and X is one equivalent of an anion.

7. Beta - (10-phenothiazinyl)ethyl-trimethylammonium chloride, which has the formula

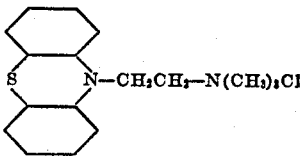

8. A 10 - (quaternary - ammonium - alkyl) - phenothiazine salt having the following structural formula

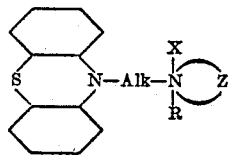

wherein Alk is a lower alkylene radical, R is a lower alkyl radical, Z is a lower alkylene radical which with N forms a saturated monocyclic heterocyclic radical which contains at least 5 and not more than 6 ring members, and X is one equivalent of an anion.

9. A 10-(quaternary-ammonium-alkyl)phenothiazine having the following structural formula

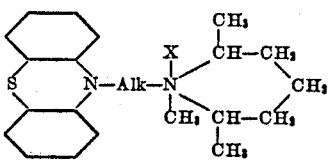

wherein Alk is a lower alkylene radical and X is halogen.

10. A 10-(quaternary-ammonium-alkyl)phenothiazine having the following structural formula

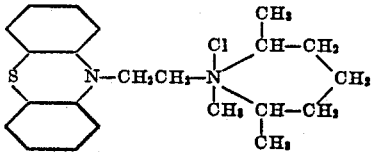

RICHARD A. ROBINSON.
JOHN W. CUSIC.

REFERENCES CITED

The following references are of record in the file of this patent:

UNITED STATES PATENTS

| Number | Name | Date |
| --- | --- | --- |
| 2,295,504 | Shelton | Sept. 8, 1942 |
| 2,439,749 | Niederl et al. | Apr. 13, 1948 |

OTHER REFERENCES

Blicke et al. Jour. Am. Chem. Soc. 64, 428–431 (1942).

Gilman et al., Jour. Am. Chem. Soc. 66, 888–892 (1944).

Winder et al., Jour. Pharmacol 87, 121–131 (1946).

Halpern et al., Comp. Rendu Soc. Biologie, vol. 115 (1946) pp. 361–365.

Wiselogle, Survey of Antimalarials 1941–1945, (1946) vol. II, part 1, pages 699–700, [Survey Numbers 2961 (March 29, 1943), 625 (October 29, 1942), 626 (October 29, 1942), 2617 (March 8, 1942), 627 (October 29, 1942), 629 (October 29, 1942), 2962 (March 29, 1943), 1843 (March 8, 1943), and 1844 (March 8, 1943).]